(12) United States Patent
Haratsch et al.

(10) Patent No.: US 8,587,888 B2
(45) Date of Patent: Nov. 19, 2013

(54) METHODS AND APPARATUS FOR SYNCHRONIZATION MARK DETECTION BASED ON A POSITION OF AN EXTREME DISTANCE METRIC

(75) Inventors: Erich F. Haratsch, Bethlehem, PA (US); Shaohua Yang, San Jose, CA (US); Nenad Miladinovic, Campbell, CA (US); Yuan Xing Lee, San Jose, CA (US)

(73) Assignee: LSI Corporation, San Jose, CA (US)

( * ) Notice: Subject to any disclaimer, the term of this patent is extended or adjusted under 35 U.S.C. 154(b) by 629 days.

(21) Appl. No.: 12/790,249

(22) Filed: May 28, 2010

(65) Prior Publication Data
US 2011/0292535 A1    Dec. 1, 2011

(51) Int. Cl.
*G11B 5/09* (2006.01)
(52) U.S. Cl.
USPC .......................................................... 360/51

(58) Field of Classification Search
None
See application file for complete search history.

(56) References Cited

U.S. PATENT DOCUMENTS

| 7,561,649 B2 | 7/2009 | Ashley et al. |
| 2010/0115209 A1 | 5/2010 | Lee et al. |

*Primary Examiner* — Regina N Holder
(74) *Attorney, Agent, or Firm* — Ryan, Mason & Lewis, LLP

(57) ABSTRACT

Methods and apparatus are provided for detection of a synchronization mark based on a position of an extreme distance metric. A synchronization mark is detected in a received signal by computing a distance metric between the received signal and an ideal version of the received signal expected when reading the synchronization mark, wherein the distance metric is computed for a plurality of positions within a search window; determining a substantially extreme distance metric within the search window; and detecting the synchronization mark based on a position of the substantially extreme distance metric. The distance metric can comprise a sum of square differences or a Euclidean distance between the received signal and the ideal version of the received signal.

31 Claims, 5 Drawing Sheets

METHODS AND APPARATUS FOR SYNCHRONIZATION MARK DETECTION BASED ON A POSITION OF AN EXTREME DISTANCE METRIC

FIELD OF THE INVENTION

The present invention is related to techniques for synchronization mark (syncMark) detection and, more particularly, to techniques for detecting a syncMark using the position of an extreme distance metric.

BACKGROUND OF THE INVENTION

Storage systems, such as disk drives, typically include one or more disks or other storage media with a plurality of concentric data tracks. A transducer is typically positioned over a destination track during a write or read operation. Servo head position information is typically recorded on the disk. One common recording format 100 for disk drives, shown in FIG. 1, includes a servo address mark (SAM) pattern 110 that identifies the start of the next set of embedded servo information, as well as a syncMark pattern 120 and a postamble pattern 130 before and after the recorded data 140, respectively.

Typically, a servo demodulator determines where to start searching for a SAM pattern based on the most recently detected SAM. Typically, the servo demodulator searches for the SAM during a time window that is based on the timing of the most recently detected SAM. Once the SAM is detected, the spacing between the SAM and the syncMark is typically known with a high degree of accuracy. Thus, a syncMark location detector can typically search for the syncMark within a relatively small window. Once the syncMark is identified, the syncMark location detector can determine where the data section is located within the recording track. The syncMark detector could miss detecting the syncMark, for example, due to signal defects where the read-back signal on the syncMark is destroyed or distorted beyond the tolerance of the syncMark detector.

A number of techniques have been proposed or suggested for improving syncMark detection. See, for example, U.S. Pat. No. 7,561,649, entitled "Method and Apparatus for Synchronization Mark Detection With DC Compensation," and United States Published Application No. 2010/0115209, entitled "Method and Apparatus for Detecting a SyncMark in a Hard Disk Drive," each incorporated by reference herein. One technique computes a metric, such as a Euclidean distance metric, for multiple positions within a syncMark search window and compares the computed metrics to a syncMark metric threshold. If the computed metric for a position satisfies the syncMark metric threshold, the syncMark is declared to be found at that position. If the computed metrics do not satisfy the syncMark metric threshold, then the syncMark metric threshold is increased and the data is physically re-read from the disk for another attempt to detect syncMark using this new syncMark metric threshold. Re-reading the data incurs additional read time and power and also reduces the channel read throughput.

Another technique, shown in FIG. 2, inserts a secondary syncMark 240 (often referred to as syncMark2 or SM2) in the data. When the syncMark detector fails to detect the first syncMark 120, the hard disk drive can rely on the second syncMark 240 to locate and detect the data. The first syncMark 120 and second syncMark 240 are typically separated by a constant length. Typically, a buffer sufficient to store the data between the first and second syncMarks 120, 240 is used to recover the data on the fly for the missing syncMark. The second syncMark 240, however, must be inserted into the data and thus impairs the format efficiency, resulting in a reduced data capacity relative to the technique of FIG. 1.

A need therefore exists for improved techniques for detecting a syncMark in a hard disk drive.

SUMMARY OF THE INVENTION

Generally, methods and apparatus are provided for detection of a synchronization mark based on a position of an extreme distance metric. The synchronization mark can be recorded on a magnetic medium or received on a communication channel. According to one aspect of the invention, a synchronization mark is detected in a received signal by computing a distance metric between the received signal and an ideal version of the received signal expected when reading the synchronization mark, wherein the distance metric is computed for a plurality of positions within a search window; determining a substantially extreme distance metric within the search window; and detecting the synchronization mark based on a position of the substantially extreme distance metric.

In one embodiment, the synchronization mark is detected if the distance metric satisfies predefined criteria, such as the distance metric being below a threshold. In another embodiment, the synchronization mark is detected using the position of the substantially extreme distance metric when a predefined metric threshold, T, is not satisfied. In a further embodiment, the synchronization mark is detected using the position of the substantially extreme distance metric without regard to a predefined distance metric threshold. In yet another embodiment, the substantially extreme distance metric is used to determine a metric threshold, T, for a re-reading of the received signal. For example, the metric threshold, T, for a re-reading of the received signal is the substantially extreme distance metric or a function of the substantially extreme distance metric.

The synchronization mark detection can optionally be conditioned upon the substantially extreme distance metric being below a second threshold, $T_2$. The various thresholds can be predefined and/or programmed by a user. The distance metric can comprise a sum of square differences or a Euclidean distance between the received signal and the ideal version of the received signal.

A more complete understanding of the present invention, as well as further features and advantages of the present invention, will be obtained by reference to the following detailed description and drawings.

DETAILED DESCRIPTION

The present invention provides improved techniques for detecting a syncMark. According to one aspect of the invention, a synchronization mark is detected in a received signal by computing a distance metric for a plurality of positions within a search window. The synchronization mark is detected based on a position of an extreme distance metric. In one exemplary embodiment, the synchronization mark is detected using the position of the extreme distance metric when a predefined metric threshold is not satisfied. In another exemplary embodiment, the synchronization mark is detected using the position of the extreme distance metric without regard to a predefined metric threshold. In yet another exemplary embodiment, the extreme distance metric is used as a predefined metric threshold for a re-reading of the received signal. While the present invention is illustrated herein in the context of an exemplary hard disk drive, the present invention can be employed in any system requiring the detection of one or more synchronization marks embedded within user data.

The present invention improves a number of existing techniques for detecting a synchronization mark based on a comparison of a distance metric to one or more corresponding thresholds. For a discussion of suitable synchronization mark detection techniques using distance metrics, see, for example, U.S. Pat. No. 7,561,649, entitled "Method and Apparatus for Synchronization Mark Detection With DC Compensation," and United States Published Application No. 2010/0115209, entitled "Method and Apparatus for Detecting a SyncMark in a Hard Disk Drive," each incorporated by reference herein.

As discussed above, FIGS. 1 and 2 illustrate exemplary conventional recording formats for disk drives. FIG. 3 illustrates an alternative recording format 300 for disk drives that incorporates features of the present invention. As shown in FIG. 3, the disclosed recording format 300 includes a servo address mark (SAM) pattern 110 that identifies the start of the next set of embedded servo information, as well as a first syncMark pattern 120, in a similar manner to FIG. 1.

As discussed hereinafter, the first syncMark pattern 120 is expected to be within a search window 320 between bit indexes $k_1$ and $k_2$. The position of bit indexes $k_1$ and $k_2$ can be determined based on a distance from a SAM, or an end of acquisition (ACQ). The ACQ happens over the preamble 2T pattern, and the end of ACQ should be on the 2T pattern and before the actual syncmark position. The search window for the syncmark could start from the end of ACQ and last for a programmed number of clock cycles. For a discussion of the 2T pattern and preamble, see for example, United States Published Application No. 2005/0243455, entitled "Method and Apparatus for Improved Address Detection."

Figure 1:
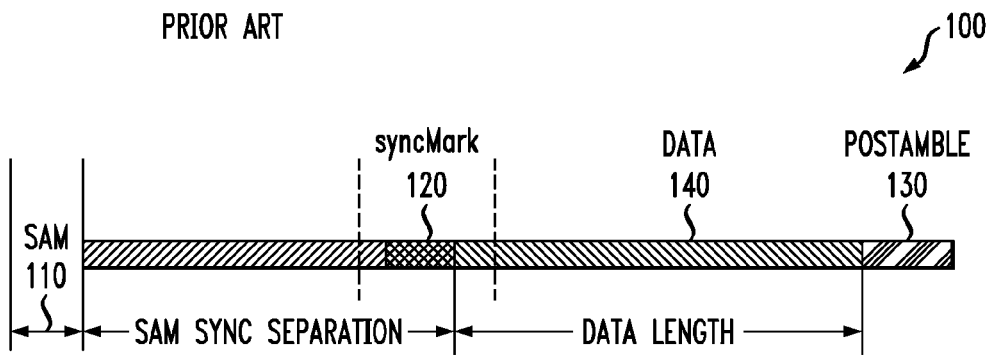
FIG. 1 illustrates an exemplary conventional recording format for disk drives.

In addition, the disclosed recording format 300 optionally includes a second syncMark pattern 330 at the end of a sector, where a postamble pattern 130 would normally be expected in the format of FIG. 1. The second syncMark pattern 330 is expected to be within a search window 340. In this manner, the disclosed recording format 300 allows the second syncMark pattern 330 to be detected, when the first syncMark pattern 120 is missed by the hard disk drive. Thus, recovery of the data can be achieved on the fly, without reducing the data capacity relative to the format of FIG. 1. The separation between the two syncMarks 120, 330 provides reliable protection against media defects and other factors causing the detection of the syncMark to fail.

Hard disk drive coders/decoders (codecs) can typically retain a complete sector of received signals and detected data for multiple decoding iterations. The decoding process typically involves multiple stages of detection and decoding, in a known manner.

Figure 2:
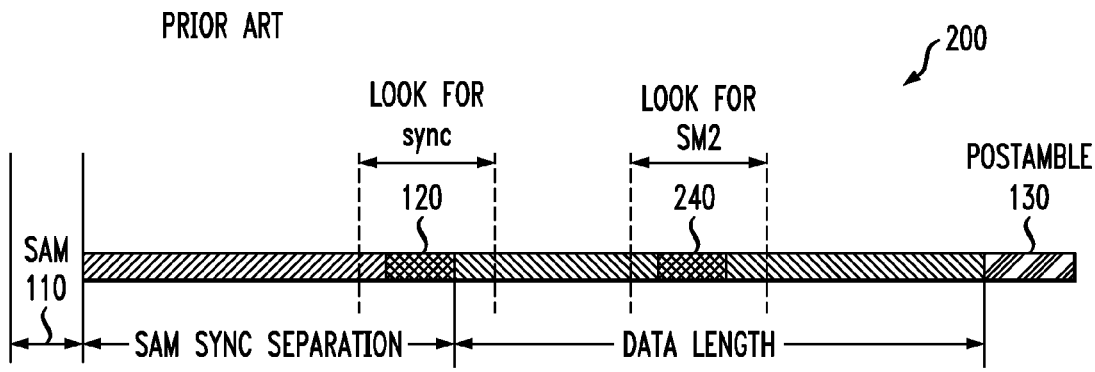
FIG. 2 illustrates an alternative exemplary conventional recording format for disk drives.
Figure 3:
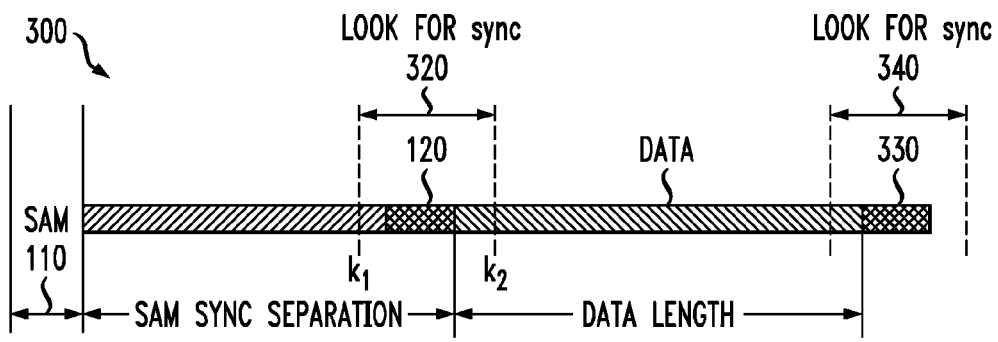
FIG. 3 illustrates an exemplary recording format for disk drives that incorporates features of the present invention.
Figure 5:
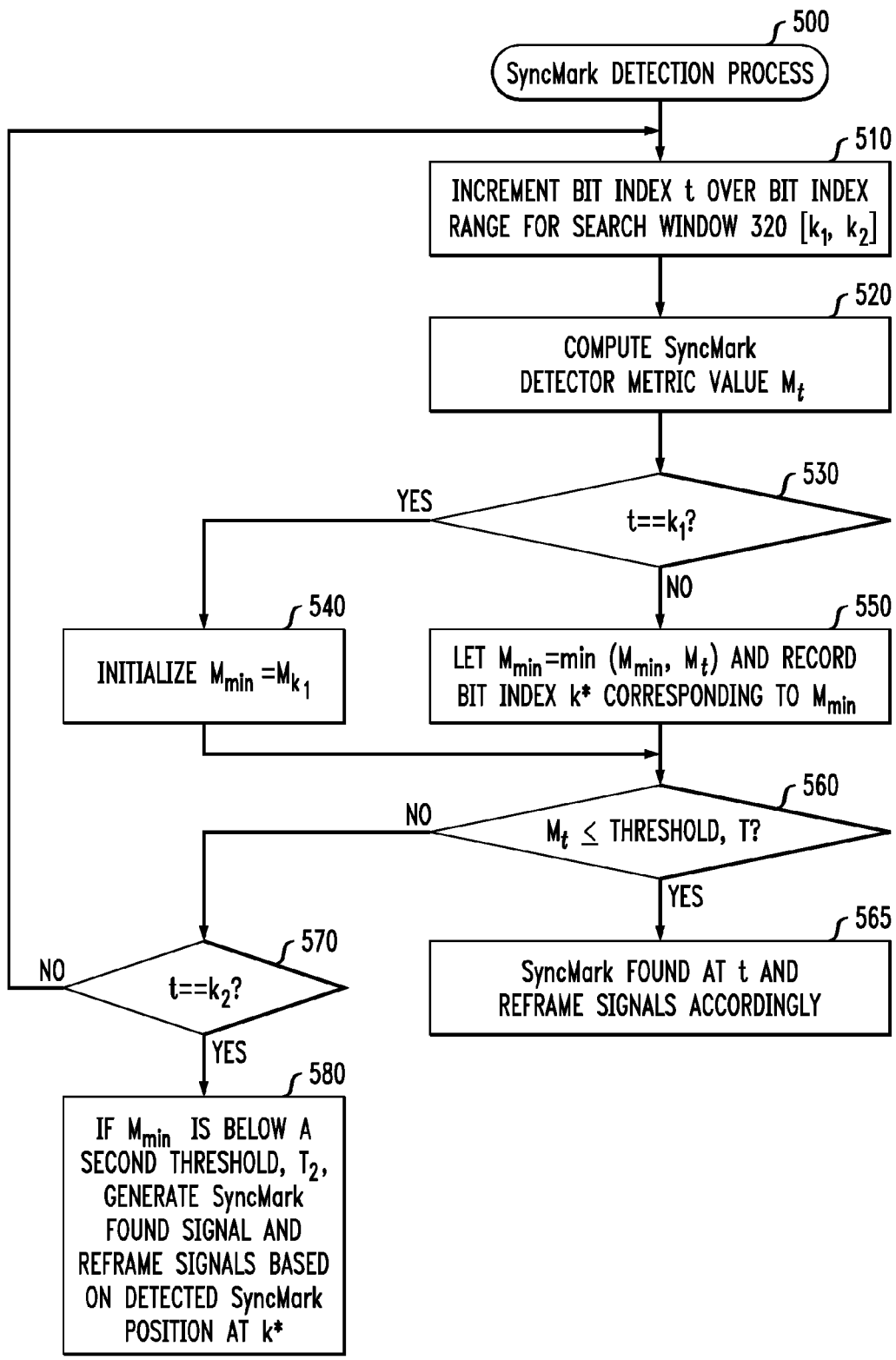
FIGS. 5-7 are flow charts describing exemplary implementations of syncMark detection processes that incorporate features of the present invention.
Figure 6:
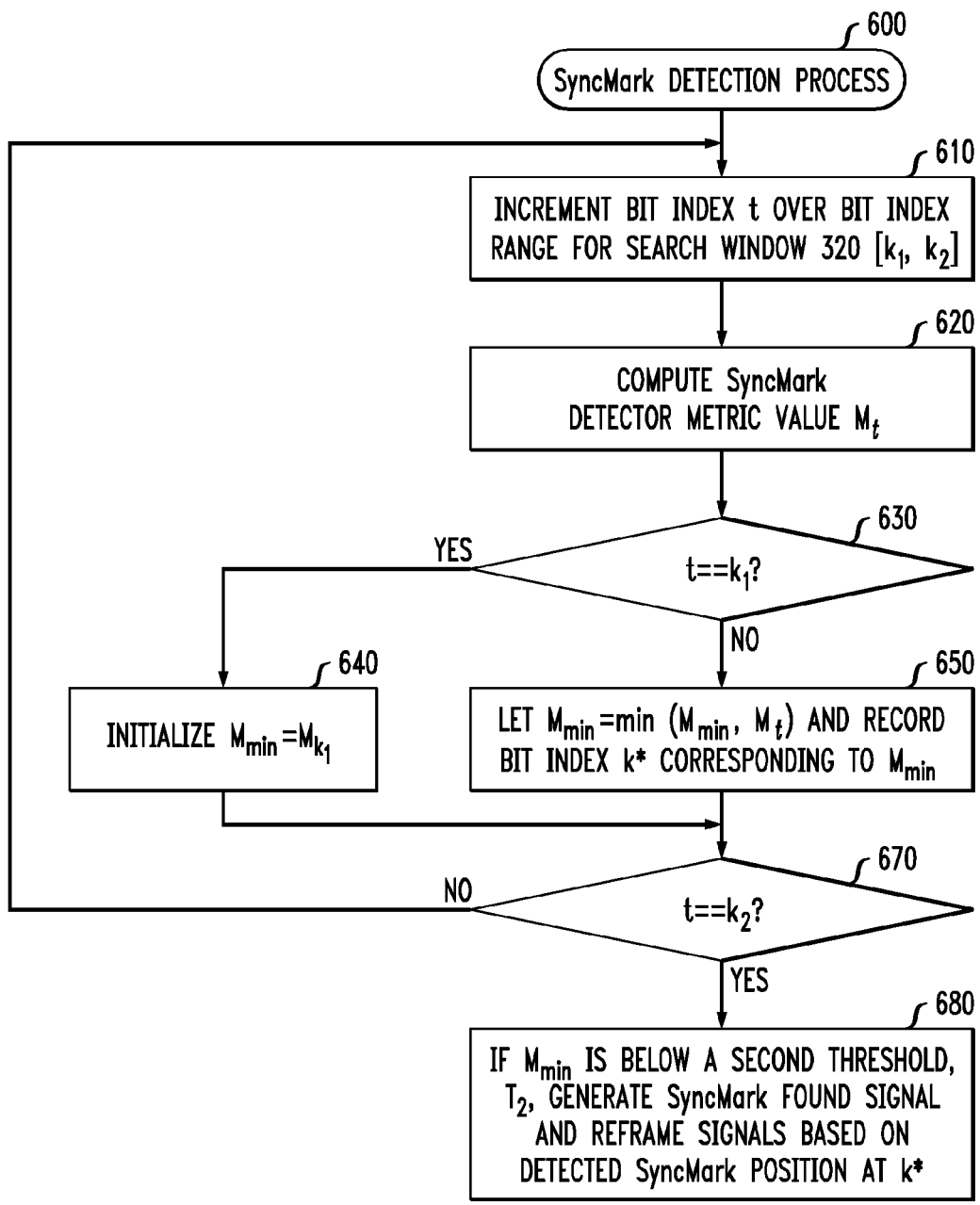
Figure 7:
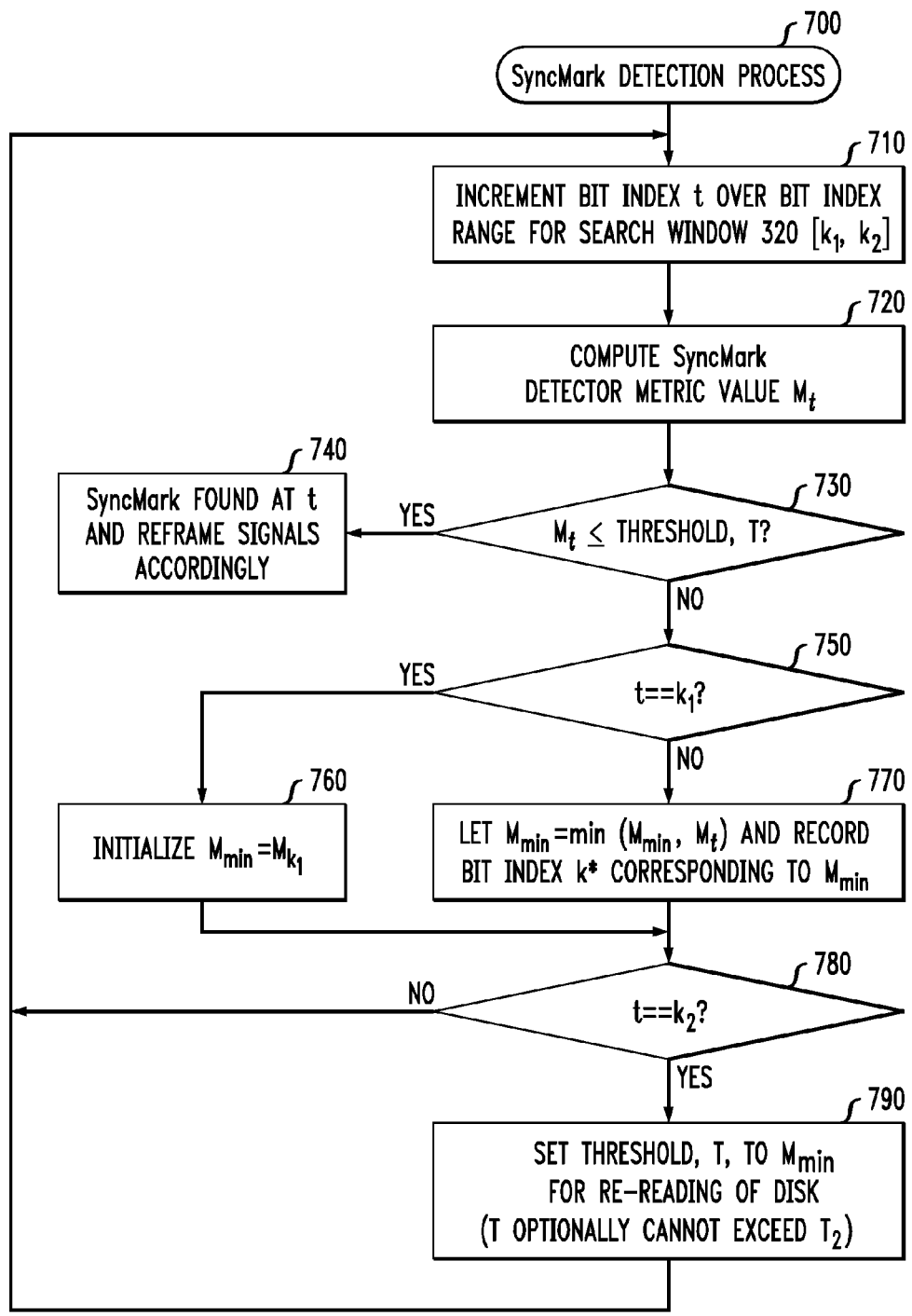

While the present invention is illustrated herein in the context of the recording format 300 of FIG. 3, each of the embodiments discussed in conjunction with FIGS. 5-7, the present invention can be implemented with any of the exemplary recording formats shown in FIGS. 1-3 (as well as additional recording formats), as would be apparent to a person of ordinary skill in the art.

Figure 4:
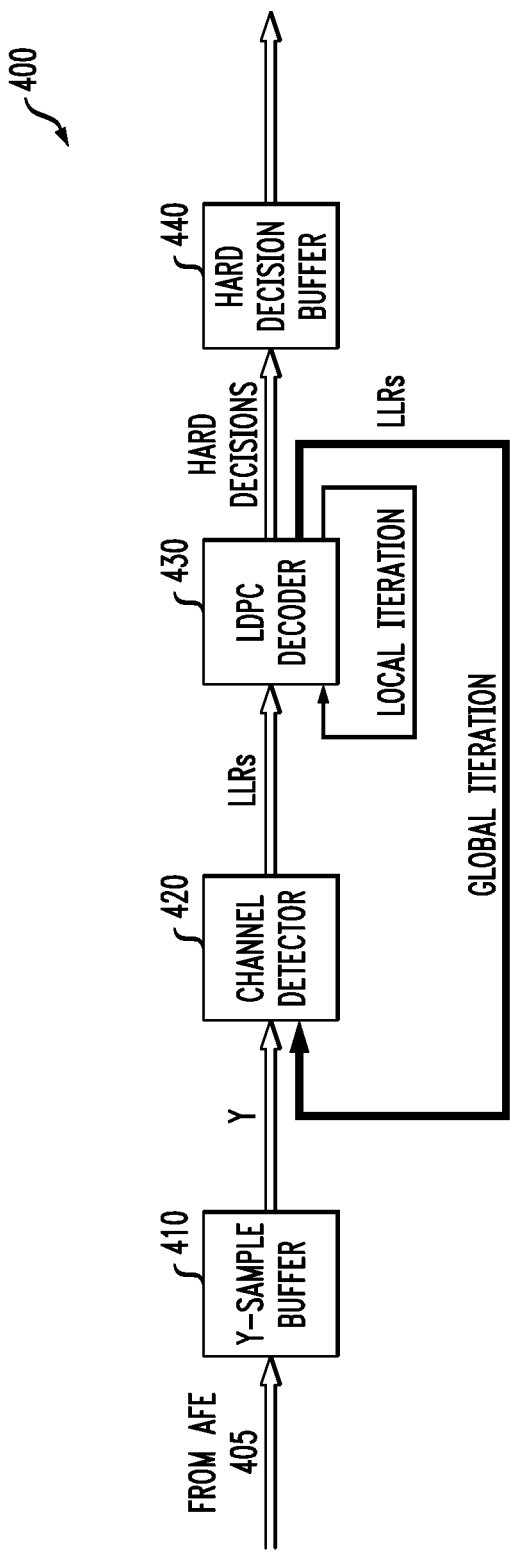
FIG. 4 is a schematic block diagram of an exemplary iterative hard disk drive.

FIG. 4 is a schematic block diagram of an exemplary iterative hard disk drive 400. As shown in FIG. 4, an analog and digital front end 405 generates equalized samples, Y. For example, the equalized samples, Y, may be obtained after a finite impulse response (FIR) filtering. For a detailed discussion of conventional iterative decoding techniques, see for example, E. Yeo et al., "VLSI Architectures for Iterative Decoders in Magnetic Recording Channels," IEEE Trans. on Magnetics, Vol. 37, No. 2, March 2001, incorporated by reference herein.

A soft channel detector 420 processes the equalized samples, Y, and generates a series of reliability information for each Y sample in the form of soft bit decisions, such as log likelihood ratios (LLRs). The LLR values are processed by an LPDC decoder 430, in a known iterative manner, to generate hard and soft decisions. The hard decisions are stored in a hard decision buffer 440. Generally, a hard bit decision is closely related to the respective detector and decoder soft output (LLR) values. Likewise, the magnitude of the detector and decoder output LLR values provides an indication of the reliability of the hard bit decision.

As previously indicated, the decoding process typically involves multiple stages of detection and decoding, in a known manner. The LDPC decoder 430 employs local iterations, and between the LDPC decoder and the soft channel detector 420 global iterations are employed if the decoding does not converge within LDPC decoder local iterations. For each global iteration, the decoder soft outputs (LLRs) are sent back to the detector for another round of detection.

FIG. 5 is a flow chart describing an exemplary implementation of a syncMark detection process 500 that incorporates features of the present invention. Generally, the exemplary syncMark detection process 500 of FIG. 5 remembers the position within a search window having a lowest distance metric and uses this position to establish the syncMark if a predefined threshold, T, is not be satisfied.

As shown in FIG. 5, the syncMark detection process 500 initially increments a bit index, t, during step 510 over a bit index range [k1, k2] for the search window 320. Thereafter, the exemplary syncMark detection process 500 computes a SyncMark detector metric value, $M_t$, during step 520, as follows, at cycle i, for the received equalized signal sample, $r_i$:

$$\sum_{j=0}^{L-1}(r_{i-j}-\hat{r}_{L-1-j})^2 \quad (1)$$

between the block of received samples, $\{r_{i-L+1}, r_{i-L+2}, \ldots, r_i\}$ and the block of ideal samples expected when reading the synchronization mark $\{\hat{r}_0, \hat{r}_1, \ldots, \hat{r}_{L-1}\}$, where L is the length of the synchronization mark. As used herein, the term "extreme distance metric" shall include a minimum or maximum distance metric. If the definition of Equation (1) is used for distance metrics, a minimum distance metric is employed to detect the syncMarks. If, however, a negative version of the definition of Equation (1) is used for distance metrics, then a maximum distance metric would be employed to detect the syncMarks. For a more detailed discussion of suitable techniques for computing a SyncMark detector metric value, such as a sum of square differences or a Euclidean distance, see, for example, U.S. Pat. No. 7,561,649, incorporated by reference herein. A test is performed during step 530 to determine if the bit index is equal to $k_1$, the first position in the search window 320. If it is determined during step 530 that the bit index is equal to $k_1$, then $M_{min}$ is initialized to $M_{k1}$ during step 540. If, however, it is determined during step 530 that the bit index is not equal to $k_1$, then $M_{min}$ is set to the lower of ($M_{min}$, $M_t$) during step 550, and the bit index k* corresponding to the new $M_{min}$ is also recorded.

A further test is performed during step 560 to determine if $M_t$ satisfies a predefined threshold, T. It is noted that in the exemplary embodiments, a threshold, T, is said to be "satisfied," if $M_t$ is below the threshold, T. In an alternative embodiment, a threshold T is said to be satisfied if $M_t$ is above the threshold, T. If it is determined during step 560 that $M_t$ satisfies the predefined threshold, T, then the SyncMark is found at t during step 565 and the signals are reframed accordingly. If, however, it is determined during step 560 that $M_t$ does not satisfy the predefined threshold, T, then a further test is performed during step 570 to determine if the bit index t is equal to $k_2$, the final position in the search window 320.

If it is determined during step 570 that the bit index is not equal to $k_2$, then program control returns to step 510 and continues in the manner described above. If, however, it is determined during step 570 that the bit index is equal to $k_2$, then the SyncMark found signal is generated during step 580 and the signals are reframed based on the detected SyncMark position at k*. As shown in the exemplary embodiment of FIG. 5, step 580 can optionally be conditioned upon the value of $M_{min}$ being below a second threshold, $T_2$. In this manner, if the minimum distance metric $M_{min}$ is too high to detect the syncMark, a read failure can be declared. Then, the data can be physically re-read from the disk and another attempt to detect syncMark using process 500 can be performed. Optionally, the syncMark metric threshold T can be increased when the data is physically reread.

It is noted that one or more of the thresholds, T and $T_2$, can be predefined or programmable by a user. In an alternative embodiment, where the distance metric $M_t$ satisfies the threshold T if $M_t$ is larger than T, step 580 can optionally be conditioned upon the value of $M_{min}$ being above a second threshold, $T_2$. In this case, also the minimum operation in step 550 is replaced by a maximum operation. In other words, the syncMark is then determined based on a maximum distance metric.

FIG. 6 is a flow chart describing an exemplary alternate implementation of a syncMark detection process 600 that incorporates features of the present invention. Generally, the exemplary syncMark detection process 600 of FIG. 6 uses the position within a search window having a lowest distance metric to establish the syncMark, without regard to a predefined minimum distance threshold, T.

As shown in FIG. 6, the syncMark detection process 600 initially increments the bit index, t, during step 610 over the bit index range [k1, k2] for the search window 320. Thereafter, the exemplary syncMark detection process 600 computes the SyncMark detector metric value, $M_t$, during step 620, in a similar manner to step 520 of FIG. 5.

A test is performed during step 630 to determine if the bit index is equal to $k_1$, the first position in the search window 320. If it is determined during step 630 that the bit index is equal to $k_1$, then $M_{min}$ is initialized to $M_{k1}$ during step 640. If, however, it is determined during step 630 that the bit index is not equal to $k_1$, then $M_{min}$ is set to the lower of ($M_{min}$, $M_t$) during step 650, and the bit index k* corresponding to $M_{min}$ is also recorded.

A further test is performed during step 670 to determine if the bit index is equal to $k_2$, the final position in the search window 320. If it is determined during step 670 that the bit index is not equal to $k_2$, then program control returns to step 610 and continues in the manner described above. If, however, it is determined during step 670 that the bit index is equal to $k_2$, then the SyncMark found signal is generated during step 680 and the signals are reframed based on the detected SyncMark position at k*. As shown in the exemplary embodiment of FIG. 6, step 680 can optionally be conditioned upon the value of $M_{min}$ being below a second threshold, $T_2$. In this manner, if the minimum distance metric $M_{min}$ is too high to detect the syncMark, a read failure can be declared. In this case, another attempt to detect syncMark can be performed by physically rereading data from the disk as described in conjunction with FIG. 5.

It is noted that one or more of the thresholds, T and $T_2$, can be predefined or programmable by a user. In an alternative embodiment, with a different computation of distance metrics, the minimum operation in step 650 is replaced by a maximum operation, and step 680 can optionally be conditioned upon the value of $M_{min}$ being above a second threshold, $T_2$. In this case, the syncMark is determined based on a maximum distance metric.

FIG. 7 is a flow chart describing another alternate implementation of a syncMark detection process 700 that incorporates features of the present invention. Generally, the exemplary syncMark detection process 700 of FIG. 7 dynamically uses the minimum distance metric as a predefined metric threshold for a re-reading of the received signal (for example, following a traditional syncmark detection failure). For example, the threshold for the next read cycle can be set to the minimum distance metric, $M_{min}$, or set to the minimum distance metric, $M_{min}$, multiplied by a scaling factor or added to an offset value. The scaling factor and offset value can optionally predefined or programmable by a user.

As shown in FIG. 7, the syncMark detection process 700 initially increments the bit index, t, during step 710 over the bit index range [k1, k2] for the search window 320. Thereafter, the exemplary syncMark detection process 700 computes the SyncMark detector metric value, $M_t$, during step 720, in a similar manner to step 520 of FIG. 5.

A test is performed during step 730 to determine if $M_t$ satisfies a predefined threshold, T. If it is determined during step 730 that $M_t$ satisfies the predefined threshold, T, then the SyncMark is found at t during step 740 and the signals are reframed accordingly. If, however, it is determined during step 730 that $M_t$ does not satisfy the predefined threshold, T, then a further test is performed during step 750 to determine if the bit index is equal to $k_1$, the first position in the search window 320.

If it is determined during step 750 that the bit index is equal to $k_1$, then $M_{min}$ is initialized to $M_{k1}$ during step 760. If, however, it is determined during step 750 that the bit index is not equal to $k_1$, then $M_{min}$ is set to the lower of ($M_{min}$, $M_t$) during step 770. Optionally, the bit index k* corresponding to $M_{min}$ can also be recorded.

A further test is performed during step 780 to determine if the bit index is equal to $k_2$, the final position in the search window 320. If it is determined during step 780 that the bit index is not equal to $k_2$, then program control returns to step 710 and continues in the manner described above. If, however, it is determined during step 780 that the bit index is equal to $k_2$, then the threshold, T, is set to $M_{min}$ during step 790 for a re-reading of the disk. In an alternative embodiment, the threshold T can be set as function of $M_{min}$ for the next read cycle, for example, equal to the minimum distance metric, $M_{min}$, multiplied by a scaling factor or added to an offset value. The scaling factor and offset value can optionally be predefined or programmable by a user. In an alternative implementation, an additional step can be added: If the newly computed threshold T for reread the disk is above a second threshold, $T_2$, the new threshold, T, is set to $T_2$. While a minimum distance metric is used for this exemplary embodiment, a maximum distance metric can also be employed, as discussed above in conjunction with FIGS. 5 and 6.

For a detailed discussion of improved detection techniques using a second syncMark, for example, at the end of the sector, see, for example, United States Patent Application, filed Oct. 31, 2008, entitled "Methods and Apparatus for Detecting a SyncMark in a Hard Disk Drive Ser. No. 12/262, 550, incorporated by reference herein.

For a discussion of other synchronization mark detection techniques, see, for example, United States Published Application No. 2005/0243455, entitled "Method and Apparatus for Improved Address Detection."

CONCLUSION

While exemplary embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, for example, a digital signal processor, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

A plurality of identical die are typically formed in a repeated pattern on a surface of the wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

It is to be understood that the embodiments and variations shown and described herein are merely illustrative of the principles of this invention and that various modifications may be implemented by those skilled in the art without departing from the scope and spirit of the invention.

We claim:

1. A method for detecting a synchronization mark in a received signal, said method comprising the steps of:

computing a distance metric between said received signal and an ideal version of said received signal expected when reading said synchronization mark, wherein said distance metric is computed for a plurality of positions within a search window;

determining a substantially extreme distance metric within said search window; and detecting said synchronization mark based on a position of said substantially extreme distance metric.

2. The method of claim 1, wherein said synchronization mark is detected if said distance metric satisfies predefined criteria.

3. The method of claim 2, wherein said predefined criteria comprises said distance metric being below or above a threshold.

4. The method of claim 1, wherein said synchronization mark is detected using said position of said substantially extreme distance metric when a predefined metric threshold, T, is not satisfied.

5. The method of claim 1, wherein said synchronization mark is detected using said position of said substantially extreme distance metric without regard to a predefined extreme distance metric threshold.

6. The method of claim 1, wherein said substantially extreme distance metric is used to determine a metric threshold, T, for a re-reading of said received signal.

7. The method of claim 6, wherein said metric threshold, T, for a re-reading of said received signal is one or more of said substantially extreme distance metric and a function of said substantially extreme distance metric.

8. The method of claim 6, wherein said metric threshold, T, for a re-reading of said received signal cannot exceed a second threshold, $T_2$.

9. The method of claim 1, wherein said synchronization mark comprises a second syncMark following data in a sector signal.

10. The method of claim 1, wherein said search window is based on an estimated location of said synchronization mark.

11. The method of claim 1, wherein said synchronization mark is recorded on a magnetic medium.

12. The method of claim 1, wherein said synchronization mark is received on a communication channel.

13. The method of claim 1, wherein said detecting step is conditioned upon said substantially extreme distance metric being above or below a second threshold, $T_2$.

14. The method of claim 1, wherein one or more thresholds are one or more of predefined and programmed by a user.

15. The method of claim 1, further comprising the step of incrementing a bit index over said search window.

16. The method of claim 1, further comprising the step of initializing said distance metric.

17. The method of claim 1, wherein said distance metric comprises a sum of square differences between said received signal and said ideal version of said received signal.

18. The method of claim 1, wherein said distance metric comprises a Euclidean distance between said received signal and said ideal version of said received signal.

19. The method of claim 1, wherein said substantially extreme distance metric comprises one or more of a minimum distance metric and a maximum distance metric.

20. A read channel, comprising:

a read head for obtaining a sector signal from a storage media, said sector signal comprising at least one synchronization mark and data;

a memory; and at least one processor, coupled to the memory, operative to:

compute a distance metric between said received signal and an ideal version of said received signal expected when reading said synchronization mark, wherein said distance metric is computed for a plurality of positions within a search window;

determine a substantially extreme distance metric within said search window; and detect said synchronization mark based on a position of said substantially extreme distance metric.

21. The read channel of claim 20, wherein said synchronization mark is detected if said distance metric satisfies predefined criteria.

22. The read channel of claim 20, wherein said synchronization mark is detected using said position of said substantially extreme distance metric when a predefined metric threshold, T, is not satisfied.

23. The read channel of claim 20, wherein said synchronization mark is detected using said position of said substantially extreme distance metric without regard to a predefined extreme distance metric threshold.

24. The read channel of claim 20, wherein said substantially extreme distance metric is used to determine a metric threshold, T, for a re-reading of said received signal.

25. The read channel of claim 24, wherein said metric threshold, T, for a re-reading of said received signal is one or more of said substantially extreme distance metric and a function of said substantially extreme distance metric.

26. The read channel of claim 20, wherein said synchronization mark is one or more of recorded on a magnetic medium and received on a communication channel.

27. The read channel of claim 20, wherein said detection of said synchronization mark is conditioned upon said substantially extreme distance metric being below or above a second threshold, $T_2$.

28. The read channel of claim 20, wherein said processor is further configured to increment a bit index over said search window.

29. The read channel of claim 20, wherein said processor is further configured to initialize said distance metric.

30. The read channel of claim 20, wherein said distance metric comprises one or more of a sum of square differences and a Euclidean distance between said received signal and said ideal version of said received signal.

31. An article of manufacture for detecting a synchronization mark in a received signal, comprising a machine readable storage medium containing one or more programs which when executed implement the steps of:

computing a distance metric between said received signal and an ideal version of said received signal expected when reading said synchronization mark, wherein said distance metric is computed for a plurality of positions within a search window;

determining a substantially extreme distance metric within said search window; and detecting said synchronization mark based on a position of said substantially extreme distance metric.

\* \* \* \* \*